(12) United States Patent
Li et al.

(10) Patent No.: US 12,482,893 B2
(45) Date of Patent: Nov. 25, 2025

(54) BATTERY, ELECTRIC APPARATUS, METHOD FOR PREPARING BATTERY, AND APPARATUS FOR PREPARING BATTERY

(71) Applicant: CONTEMPORARY AMPEREX TECHNOLOGY (HONG KONG) LIMITED, Hong Kong (CN)

(72) Inventors: Jinfeng Li, Ningde (CN); Lei Wang, Ningde (CN); Feng Qin, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 649 days.

(21) Appl. No.: 17/846,529

(22) Filed: Jun. 22, 2022

(65) Prior Publication Data
US 2022/0376353 A1    Nov. 24, 2022

Related U.S. Application Data

(63) Continuation of application No. PCT/CN2021/076279, filed on Feb. 9, 2021.

(51) Int. Cl.
*H01M 50/325* (2021.01)
*H01M 50/204* (2021.01)
*H01M 50/548* (2021.01)

(52) U.S. Cl.
CPC ....... *H01M 50/325* (2021.01); *H01M 50/204* (2021.01); *H01M 50/548* (2021.01)

(58) Field of Classification Search
CPC . H01M 50/325; H01M 50/548; H01M 50/204
See application file for complete search history.

(56) References Cited

U.S. PATENT DOCUMENTS

| | | | |
|---|---|---|---|
| 10,529,960 B2 | 1/2020 | Yamashita et al. | |
| 2013/0143085 A1* | 6/2013 | Yoon | H01M 50/55 429/90 |

(Continued)

FOREIGN PATENT DOCUMENTS

| | | |
|---|---|---|
| CN | 206471390 U | 9/2017 |
| CN | 206758598 U | 12/2017 |

(Continued)

OTHER PUBLICATIONS

International Search Report for PCT application No. PCT/CN2021/076279, dated Oct. 28, 2021, 4 pages.

(Continued)

*Primary Examiner* — Miriam Stagg
*Assistant Examiner* — M. T. Leonard
(74) *Attorney, Agent, or Firm* — K&L Gates LLP

(57) ABSTRACT

Embodiments of this application provide a battery, an electric apparatus, and a method and an apparatus for preparing a battery. The battery includes a plurality of battery cells arranged in a first direction and electrically connected to each other. At least one of two adjacent battery cells has a pressure relief mechanism. The pressure relief mechanism is disposed at an end of the battery cell in the first direction. The battery further includes a sampling member connected to the battery cells and configured to perform signal collection on the battery cells, and a protective member disposed between the two adjacent battery cells and disposed opposite the pressure relief mechanism. There is a degassing space between the protective member and the pressure relief mechanism, and the protective member is fixed to the sampling member.

18 Claims, 15 Drawing Sheets

(56) References Cited

U.S. PATENT DOCUMENTS

| | | | | |
|---|---|---|---|---|
| 2013/0280969 | A1* | 10/2013 | Kwon | H01R 4/26 |
| | | | | 439/890 |
| 2014/0302357 | A1 | 10/2014 | Tsuruta et al. | |
| 2014/0322581 | A1* | 10/2014 | Ruter | H01M 50/503 |
| | | | | 429/186 |
| 2017/0373287 | A1 | 12/2017 | Yamashita et al. | |
| 2018/0166751 | A1* | 6/2018 | Boisserée | H01M 10/486 |
| 2020/0350636 | A1 | 11/2020 | Zhu et al. | |

FOREIGN PATENT DOCUMENTS

| | | |
|---|---|---|
| CN | 110148692 A | 8/2019 |
| CN | 209860056 U | 12/2019 |
| CN | 111081937 A | 4/2020 |
| CN | 112331992 A | 2/2021 |
| DE | 102014206654 A1 | 10/2014 |

OTHER PUBLICATIONS

Written Opinion for PCT application No. PCT/CN2021/076279, dated Oct. 28, 2021, 5 pages.
Third extended European search report received in the corresponding European Application 21908114.8, mailed Sep. 1, 2023.

* cited by examiner (a)

(b)

BATTERY, ELECTRIC APPARATUS, METHOD FOR PREPARING BATTERY, AND APPARATUS FOR PREPARING BATTERY

CROSS REFERENCE TO RELATED APPLICATION

This application is a continuation of International Patent Application No. PCT/CN2021/076279, filed on Feb. 9, 2021, the entire content of which is incorporated herein by reference.

TECHNICAL FIELD

This application relates to the field of energy storage apparatuses, and more specifically, to a battery, an electric apparatus, a method for preparing a battery, and an apparatus for preparing a battery.

BACKGROUND

Energy conservation and emission reduction are key to sustainable development of automobile industry. Under this circumstance, electric vehicles have become an important part for the sustainable development of the automobile industry due to their energy-saving and environment-friendly advantages. Battery technologies are an important factor related to the development of electric vehicles.

With continuous development of battery technologies, higher requirements are put forward for performance of batteries, and it is desired that many design factors are taken into considerations.

SUMMARY

This application provides a battery, an electric apparatus, a method for preparing a battery, and an apparatus for preparing a battery, to improve safety of the battery.

According to a first aspect, a battery is provided and includes: a plurality of battery cells arranged in a first direction and electrically connected to each other, where at least one of two adjacent battery cells has a pressure relief mechanism, the pressure relief mechanism is disposed at an end of the battery cell in the first direction; a sampling member connected to the battery cells and configured to perform signal collection on the battery cells; and a protective member disposed between the two adjacent battery cells and opposite the pressure relief mechanism, where there is a degassing space between the protective member and the pressure relief mechanism, and the protective member is fixed to the sampling member.

In the technical solutions of the embodiments of this application, for the plurality of battery cells arranged in the first direction and electrically connected to each other, the sampling member is used for signal collection, and the pressure relief mechanism is provided at an end of the at least one battery cell. Therefore, the pressure relief mechanism is located between two adjacent battery cells.

Generally, when the pressure relief mechanism is opened, a temperature of a gas spewed by the pressure relief mechanism is up to more than one thousand degrees Celsius. When the pressure relief mechanism is disposed between the two adjacent battery cells, heat generated by one battery cell in thermal runaway can be further conducted to the other battery cell disposed opposite the battery cell, causing serious thermal runaway. Under the condition that the sampling member is also disposed between the two battery cells, the sampling member is prone to be damaged.

In the technical solutions of this application, the protective member is fixed to the sampling member, so that the protective member is located between the two adjacent battery cells and disposed opposite the pressure relief mechanism, and thus the protective member can be used to achieve heat insulation and fire prevention in the event of thermal runaway, to prevent heat generated by one battery cell in thermal runaway from being further conducted to the other battery cell disposed opposite the battery cell. Furthermore, the degassing space formed between the protective member and the pressure relief mechanism can make gas guiding and discharging easy, so that the aforementioned problem of thermal runaway diffusion does not occur.

In some embodiments, a surface of the protective member disposed opposite the pressure relief mechanism is a flat surface.

In some embodiments, a surface of the protective member disposed opposite the pressure relief mechanism is a curved surface.

Herein, the surface of the protective member opposite the pressure relief mechanism refers to a surface of the protective member facing the pressure relief mechanism.

In some embodiments, the protective member includes a base portion and a protrusion, the base portion is disposed opposite the pressure relief mechanism, the protrusion is located at an end of the base portion in a second direction and extends from the base portion toward the pressure relief mechanism, and the second direction is perpendicular to the first direction. To be specific, the base portion of the protective member is disposed opposite the pressure relief mechanism, to block emissions spewed from the pressure relief mechanism from spewing to the oppositely disposed battery cell. The emissions from the pressure relief mechanism include high-temperature gas or liquid or solid impurities or flames. Moreover, a protrusion formed at an end of the base portion in the second direction can block the emissions from directly spewing to other adjacent battery cells, thereby minimizing adverse impact on other battery cells adjacent to the end of the base portion in the second direction.

In some embodiments, the protective member has the protrusion at two ends of the base portion in the second direction. In this way, the emissions can be more effectively prevented from directly spewing to other adjacent battery cells, thereby minimizing adverse impact on other adjacent battery cells at two ends in the second direction.

In some embodiments, a surface of the protrusion adjacent to the base portion is a curved surface, and the curved surface is formed so as to be recessed toward the base portion. To be specific, the protrusion and the base portion are connected through the curved surface, so that the emissions spewed from the pressure relief mechanism can be smoothly guided.

In some embodiments, a plurality of protruding guide strips are provided on the surface of the protrusion adjacent to the base portion, the plurality of guide strips are arranged in a third direction, and the third direction is perpendicular to the first direction and the second direction. Guide strips are formed for flow diversion, and the plurality of guide strips are arranged in the third direction, and therefore these guide strips can be used to better guide the emissions to two sides of the pressure relief mechanism in the second direction.

In some embodiments, a plurality of protuberances are formed between two adjacent guide strips. Such protuberances can more effectively reduce a flow rate of the emissions.

In some embodiments, a height at which the protuberances protrude from a surface of the protective member is smaller than a height at which the guide strips protrude from the surface of the protective member. In this way, the protuberances do not affect the flow guiding effect of the guide strips on the emissions.

In some embodiments, an area of a part of the protective member disposed opposite the pressure relief mechanism is 0.35 to 1.5 times an area of the pressure relief mechanism. The area of the part of the protective member disposed opposite the pressure relief mechanism in the first direction is within this range, such that the emissions spewed from the pressure relief mechanism can be effectively blocked, gases discharged from the pressure relief mechanism can be well guided to prevent adjacent battery cells from thermal runaway.

In some embodiments, the battery further has an installation plate, where two ends of the installation plate in the first direction are respectively connected to two adjacent battery cells, and the installation plate is configured to fix to the sampling member. In this way, the sampling member can be fixed with a simple structure.

In some embodiments, a plurality of vent holes are formed in the installation plate, and guide members are correspondingly provided in a zone of the installation plate adjacent to the vent holes for guiding emissions discharged from the pressure relief mechanism to the vent holes. In this way, the guide member can guide the emissions discharged from the pressure relief mechanism to the vent holes, thereby further preventing adjacent battery cells from thermal runaway.

In some embodiments, the guide member and the installation plate are of an integral structure, and the guide member has an inclined surface inclined from the protective member toward the vent holes. To be specific, the guide member is a part of the installation plate, and the inclined surface inclined from the protective member toward the vent holes is formed on the installation plate, to guide the emissions discharged from the pressure relief mechanism to the vent holes of the installation plate.

In some embodiments, each of the battery cells includes a can and two electrode terminals of opposite polarities, the two electrode terminals are respectively disposed at two ends of the can in the first direction, and at least one of the electrode terminals protrudes from the can in a direction leaving an interior of the battery cell.

In some embodiments, in the first direction, a gap is formed between the two adjacent battery cells, a connecting portion of the sampling member is located in the gap, the connecting portion is configured to connect the electrode terminals of the battery cell, and the protective member is fixed to the connecting portion. In this way, gaps between adjacent battery cells can be used for arranging sampling members, reducing space occupied by the sampling members, making the structure more compact, and increasing the energy density of the battery.

In some embodiments, the connecting portion is connected to a circumferential side wall of the electrode terminal. By performing signal collection on the circumferential side wall of the electrode terminal protruding from the can instead of on an end face of the electrode terminal, the space occupied by the sampling member can be further reduced, the structure is more compact, and the energy density of the battery is increased.

In some embodiments, the connecting portion is elastic, is configured to deform in response to an external force to attach to the circumferential side wall of the electrode terminal, so as to achieve surface contact with the electrode terminal. Because the connecting portion is elastic and can be elastically deformed to contact the surface of the electrode terminal under the action of the external force, the connecting portion can adaptively and tightly fit the electrode terminal, and a stable electrical connection between the sampling member and the electrode terminal can be realized with a simple structure.

In some embodiments, the electrode terminal protruding from the can is cylindrical, and the connecting portion wraps the electrode terminal by an angle greater than 0 degrees and less than 180 degrees.

In some embodiments, the connecting portion is clamped to the circumferential side wall of the electrode terminal. To be specific, the connecting portion is electrically connected to the circumferential side wall of the electrode terminal by means of a clamping connection, to achieve a stable electrical connection.

In some embodiments, the connecting portion is fully attached to a side wall of the electrode terminal. Under the condition that an electrical connection is achieved through elastic deformation or clamping, by fully attaching the connecting portion to the circumferential side wall of the electrode terminal, a contact area between the connecting portion and the circumferential side wall of the electrode terminal can be increased, and a good electrical connection can be achieved more stably.

In some embodiments, the connecting portion wraps the electrode terminal by a size greater than or equal to one half of a circumference of the side wall of the electrode terminal and less than the circumference of the side wall of the electrode terminal. The connecting portion has an opening formed for clamping the circumferential side wall of the electrode terminal and wrapping the electrode terminal in a large area, and therefore structural stability can be enhanced.

In some embodiments, the electrode terminal protruding from the can is cylindrical, and the connecting portion wraps the electrode terminal by an angle greater than or equal to 180 degrees and less than 360 degrees. The electrode terminal is cylindrical, so that the sampling member can be more easily installed on the electrode terminal.

In some embodiments, a plurality of convex portions are provided on an inner surface of the connecting portion, and are configured to clamp the circumferential side wall of the electrode terminal. In some embodiments, a plurality of concave portions corresponding to the convex portions are formed in the circumferential side wall of the electrode terminal, and the convex portions fit the concave portions. In this way, the connecting portion can be prevented from moving or rotating relative to the electrode terminal, thereby improving the structural stability.

In some embodiments, the two electrode terminals of each of the battery cells protrude from the can in the direction leaving the interior of the battery cell, and in the two adjacent battery cells, the electrode terminals of one battery cell are disposed opposite and butt up against the electrode terminals of the other battery cell. Because the electrode terminals the two adjacent battery cells directly butt up to achieve electrical connection, components for electrical connection can be reduced, thereby increasing the energy density of the battery.

In some embodiments, in the two adjacent battery cells, the electrode terminals of one battery cell are welded together with the electrode terminals of the other battery cell. By directly welding such two protruding electrode terminals in this way, a stable electrical connection between the two adjacent battery cells can be achieved.

In some embodiments, in the two adjacent battery cells, the electrode terminals of one battery cell are welded together with the electrode terminals of the other battery cell, and contact zones between the sampling member and the electrode terminals and welding zones of the electrode terminals are staggered in the first direction. When the two electrode terminals are welded, uneven welding zones are often formed on the two electrode terminals. By staggering the contact zones between the sampling member and the electrode terminals and the welding zones of the electrode terminals in the first direction, the sampling member can be prevented from being connected to the welding zones to cause poor contact and lower sampling accuracy, and therefore assembly accuracy can be improved.

According to a second aspect, an electric apparatus is provided and includes the battery according to the first aspect. The battery is configured to provide electric energy.

According to a third aspect, a method for preparing a battery is provided and includes: providing a plurality of battery cells, where the plurality of battery cells are arranged in a first direction and electrically connected to each other, at least one of two adjacent battery cells has a pressure relief mechanism, and the pressure relief mechanism is disposed at an end of the battery cell in the first direction; providing a sampling member, where the sampling member is connected to the battery cells and configured to perform signal collection on the battery cells; and providing a protective member, where the protective member is disposed between the two adjacent battery cells and opposite the pressure relief mechanism, there is a degassing space between the protective member and the pressure relief mechanism, and the protective member is fixed to the sampling member.

According to a fourth aspect, an apparatus for preparing a battery is provided and includes: a first providing module, configured to provide a plurality of battery cells, where the plurality of battery cells are arranged in a first direction and electrically connected to each other, at least one of two adjacent battery cells has a pressure relief mechanism, and the pressure relief mechanism is disposed at an end of the battery cell in the first direction; a second providing module, configured to provide a sampling member fixed to a protective member; an installation module, configured to connect the sampling member to the battery cells; where the sampling member is configured to perform signal collection on the battery cells and make the protective member disposed between the two adjacent battery cells and opposite the pressure relief mechanism, and there is a degassing space between the protective member and the pressure relief mechanism.

BRIEF DESCRIPTION OF DRAWINGS

The drawings described herein are intended for a further understanding of this application and constitute a part of this application. Example embodiments of this application and descriptions thereof are intended to explain this application, and do not constitute any inappropriate limitation on this application. In the accompanying drawings.

DETAILED DESCRIPTION

Figure 1:
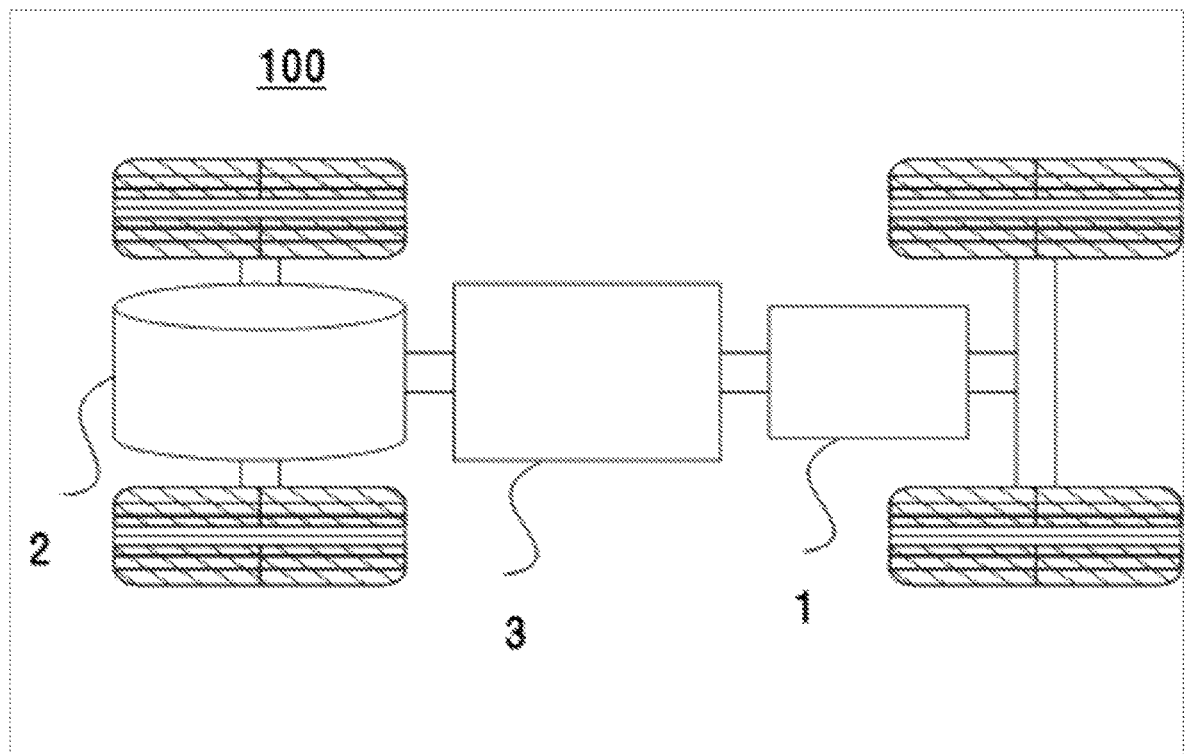
FIG. 1 is a schematic diagram of a vehicle according to an embodiment of this application.

To make the objectives, technical solutions, and advantages of the embodiments of this application clearer, the following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application belongs. The terms used in the specification of this application are merely intended to describe the specific embodiments but not intended to constitute any limitation on this application. The terms "include", "comprise", and any variations thereof in the specification and claims of this application and the foregoing description of the drawings are intended to cover non-exclusive inclusions. In the specification and claims or the foregoing description of the drawings of this application, the terms "first", "second", and so on are intended to distinguish between different objects but do not indicate a particular order or a primary-secondary relationship.

The term "embodiment" described in this application means that specific features, structures or characteristics in combination with descriptions of the embodiments may be incorporated in at least one embodiment of this application. The word "embodiment" in various positions in the specification does not necessarily refer to a same embodiment, or an independent or alternative embodiment that is exclusive of other embodiments. Persons skilled in the art explicitly and implicitly understand that the embodiments described in this application may combine with another embodiment.

In the descriptions of this application, it should be noted that unless otherwise specified and defined explicitly, the terms "installment", "link", "connection", and "attachment" should be understood in their general senses. For example, the terms may be a fixed connection, a detachable connection, or an integrated connection, or may be a direct connection, or an indirect connection through an intermediate medium, or a communication between two elements. A person of ordinary skill in the art can understand specific meanings of these terms in this application based on specific situations.

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In this application, "a plurality of" means two (inclusive) or more. Similarly, "a plurality of groups" means two (inclusive) or more groups, and "a plurality of pieces" means two (inclusive) or more pieces.

The battery mentioned in the embodiments of this application refers to an individual physical module that includes more battery cells for providing a higher voltage and capacity. For example, the battery mentioned in this application may include a battery module, a battery pack, or the like.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. A current collector uncoated with the positive electrode active substance layer bulges out of a current collector coated with the positive electrode active substance layer, and the current collector uncoated with the positive electrode active substance layer is used as a positive tab. Using the lithium-ion battery as an example, a material of the positive electrode current collector may be aluminum, and the positive electrode active substance may be lithium cobalt oxide, lithium iron phosphate, ternary lithium, lithium manganate oxide, or the like. The negative electrode plate includes a negative electrode current collector and a negative electrode active substance layer. The negative electrode active substance layer is applied on a surface of the negative electrode current collector. A current collector uncoated with the negative electrode active substance layer bulges out of a current collector coated with the negative electrode active substance layer, and the current collector uncoated with the negative electrode active substance layer is used as a negative tab. A material of the negative electrode current collector may be copper, and the negative electrode active substance can be carbon, silicon, or the like. To allow a large current to pass without any fusing, a plurality of positive tabs are provided and stacked together, and a plurality of negative tabs are provided and are stacked together. The separator may be made of PP, PE, or the like. In addition, the electrode assembly may have a winding structure or a laminated structure. This embodiment of this application is not limited thereto.

The development of battery technologies should consider many design factors, for example, performance parameters such as energy density, cycle life, discharge capacity, and charge and discharge rate. In addition, safety of batteries needs to be considered.

At present, a battery of an electric vehicle often requires tens or even hundreds of battery cells.

In practical applications, due to minor differences in some parameters (for example, voltage, internal resistance, and SOC (state of charge)) between battery cells, as the use time increases, differences between the battery cells become increasingly large. If these differences are left unchecked, consistency of the battery cells will be worse, affecting performance of the battery, and even causing serious consequences, even causing fires, explosions, and other accidents. Therefore, a sampling apparatus is installed in the battery, and corresponding control and treatment can be made under the condition that abnormality is found.

In the prior art, generally, when a pressure relief mechanism at an end of a battery cell is opened, a temperature of a gas spewed by the pressure relief mechanism is up to more than one thousand degrees Celsius. When the pressure relief mechanism is disposed between the two adjacent battery cells, heat generated by one battery cell in thermal runaway can be further conducted to the other battery cell disposed opposite the battery cell, causing serious thermal runaway. Under the condition that the sampling member is also disposed between the two battery cells, the sampling member is prone to be damaged.

In view of this, in a technical solution, this application provides a battery, including: a plurality of battery cells arranged in a first direction and electrically connected to each other, where at least one of two adjacent battery cells has a pressure relief mechanism, the pressure relief mechanism is disposed at an end of the battery cell in the first direction; a sampling member connected to the battery cells and configured to perform signal collection on the battery cells; and a protective member disposed between the two adjacent battery cells and opposite the pressure relief mechanism, where there is a degassing space between the protective member and the pressure relief mechanism, and the protective member is fixed to the sampling member.

In this way, the protective member installed on the sampling member can be used to insulate heat and prevent fire in the event of thermal runaway, and prevent heat generated by a battery cell in thermal runaway from being further conducted to the other battery cell disposed opposite the battery cell. Furthermore, the degassing space formed between the protective member and the pressure relief mechanism makes gas guiding and discharging easy, so that the aforementioned problem of thermal runaway diffusion does not occur.

An embodiment of this application provides an electric apparatus, and a battery is configured to provide electric energy.

The technical solutions described in the embodiments of this application are applicable to various apparatuses that use batteries, such as mobile phones, portable devices, notebook computers, electric bicycle, electric toys, electric tools, electric vehicles, ships, and spacecrafts. For example, spacecrafts include airplanes, rockets, space shuttles, and spaceships.

It should be understood that the technical solutions described in the embodiments of this application are not only applicable to the devices described above, but also applicable to all devices that use batteries. However, for brevity of description, the following embodiments are all described by using an electric vehicle as an example.

For example, FIG. 1 is a schematic structural diagram of a vehicle 100 according to an embodiment of this application. The vehicle 100 may be a fuel vehicle, a gas vehicle, or a new energy vehicle, and the new energy vehicle may be a battery electric vehicle, a hybrid electric vehicle, an extended range electric vehicle, or the like. A motor 2, a controller 3, and a battery 1 may be arranged inside the vehicle 100, where the controller 3 is configured to control the battery 1 to supply power to the motor 2. For example, the battery 1 may be arranged at the bottom of or the front or rear of the vehicle 100. The battery 1 may be configured to supply power to the vehicle 100. For example, the battery 1 may be used as an operational power supply for the vehicle 100 and used for a circuit system of the vehicle 100, for example, for a working electricity demand during start, navigation, and operation of the vehicle 100. In another embodiment of this application, the battery 1 may be used not only as the operational power supply for the vehicle 100 but also as a driving power supply for the vehicle 100, completely or partially replacing the fossil fuel or the natural gas to provide driving power for the vehicle 100.

To meet different power usage requirements, the battery 1 may include a plurality of battery cells 20, where the plurality of battery cells 20 may be connected in series, parallel, or series and parallel, and being connected in series and parallel refers to a combination of series and parallel connections.

Figure 2:
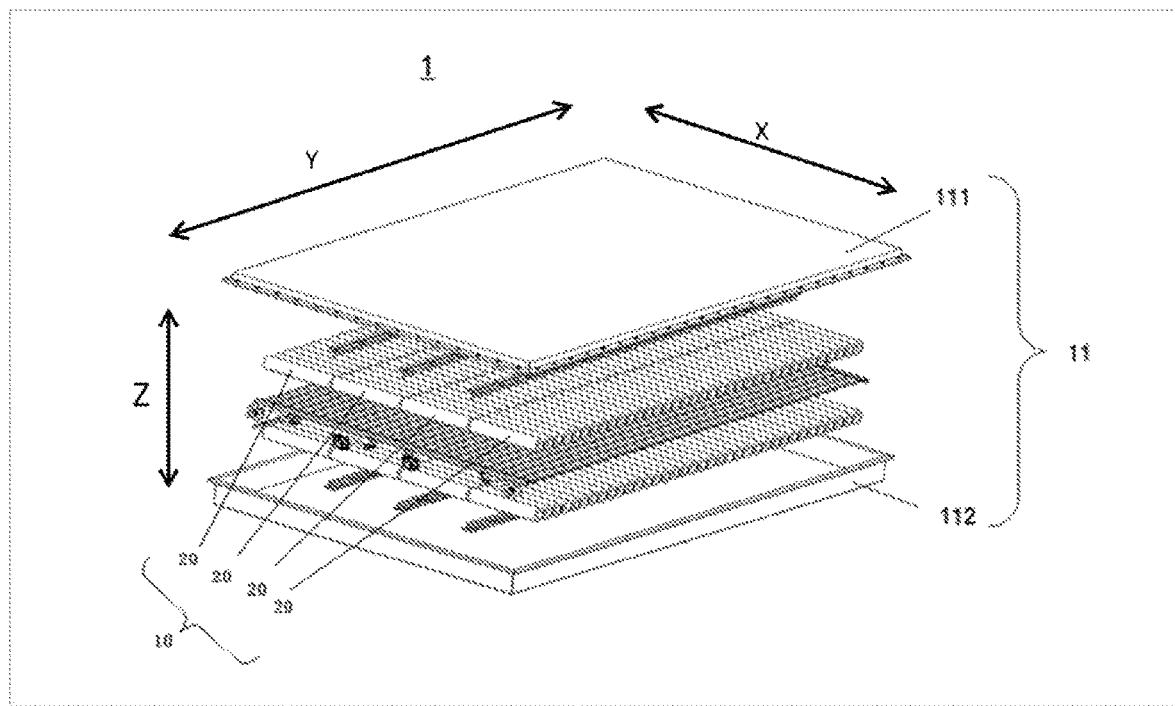
FIG. 2 is a schematic structural diagram of a battery according to an embodiment of this application.

For example, FIG. 2 is a schematic structural diagram of a battery 1 according to an embodiment of this application. The battery 1 may include a plurality of battery units 10, and each battery unit 10 includes a plurality of battery cells 20 arranged in a first direction X and electrically connected to each other. The plurality of battery units 10 are arranged in a second direction Y. The second direction Y is perpendicular to the first direction X. To be specific, the plurality of battery cells 20 in the battery 1 are arranged in a matrix structure. Optionally, the battery 1 may alternatively have only one battery unit 10, and the battery unit 10 includes a plurality of battery cells 20 arranged in the first direction X and electrically connected to each other. The battery 1 may further include a box body 11, the box body 11 has a hollow structure inside, and the plurality of battery cells 20 are accommodated in the box body 11. As shown in FIG. 2, the box body 11 may include two parts, which are referred to herein as an upper cover 111 and a box shell 112 respectively. The upper cover 111 and the box shell 112 are interlocked. Shapes of the upper cover 111 and the box shell 112 may be determined depending on a shape in which the plurality of battery cells 20 are combined. For example, the upper cover 111 and the box shell 112 may both be hollow cuboids, each with only one surface used as an opening surface, an opening of the upper cover 111 and an opening of the box shell 112 are disposed oppositely, and the upper cover 111 and the box shell 112 are interlocked to form the box body with a closed chamber. Alternatively, the upper cover 111 is a cuboid with an opening and the box shell 112 is in a plate shape, or the box shell 112 is a cuboid with an opening and the upper cover 111 is in a plate shape, and the upper cover 111 and the box shell 112 are disposed oppositely and interlocked to form the box body with a closed chamber. After the plurality of battery cells 20 are connected in parallel, series, or series and parallel, they are placed in the box body formed after the upper cover 111 and the box shell 112 are interlocked.

Figure 3:
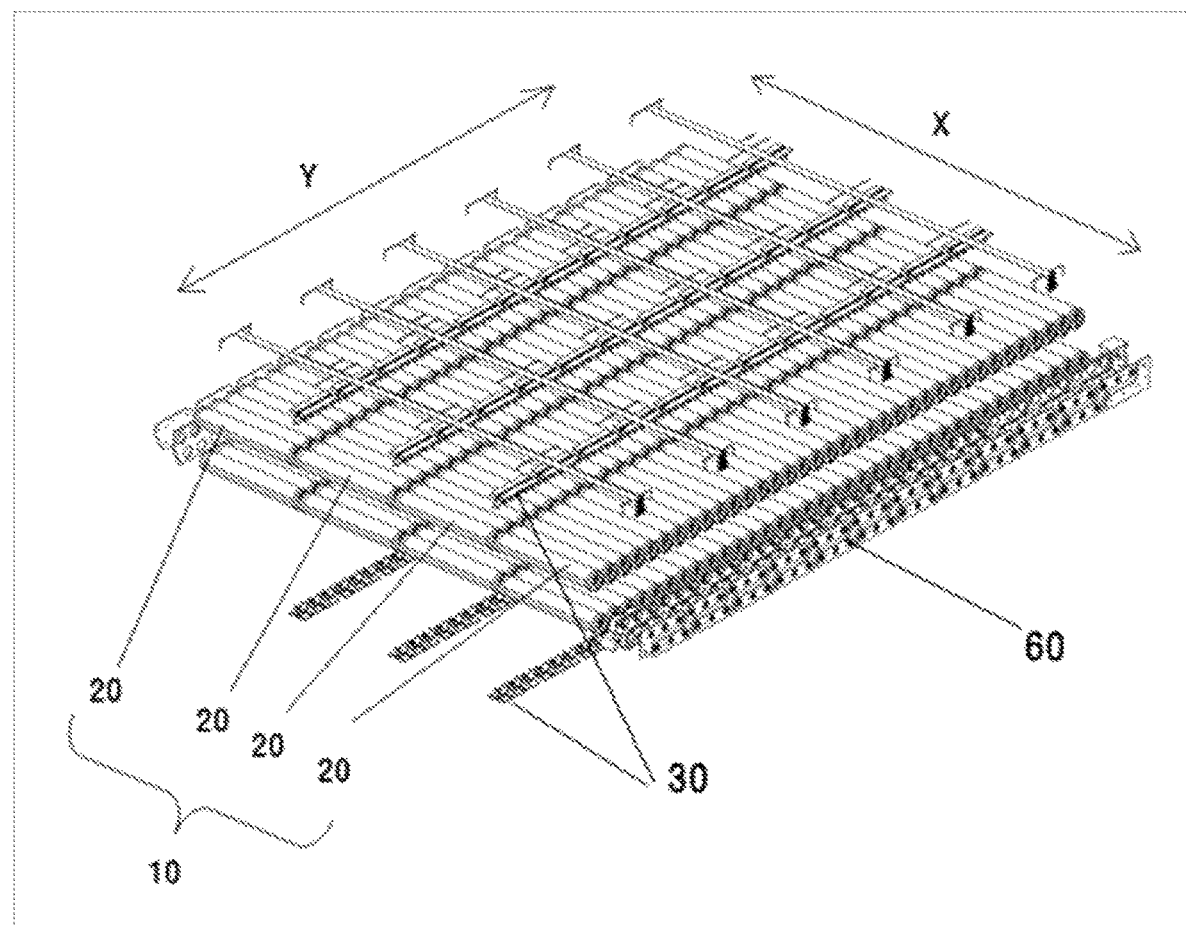
FIG. 3 is a schematic structural diagram of a plurality of battery cells arranged in a matrix according to an embodiment of this application.

As shown in FIG. 3, the plurality of battery cells 20 are arranged in the first direction X and electrically connected to each other to form the battery unit 10. Specifically, the battery unit 10 is formed by connecting the plurality of battery cells 20 in series. The plurality of battery units 10 are arranged in the second direction Y, and the plurality of battery units 10 are electrically connected to each other through a bus component 60.

Figure 4:
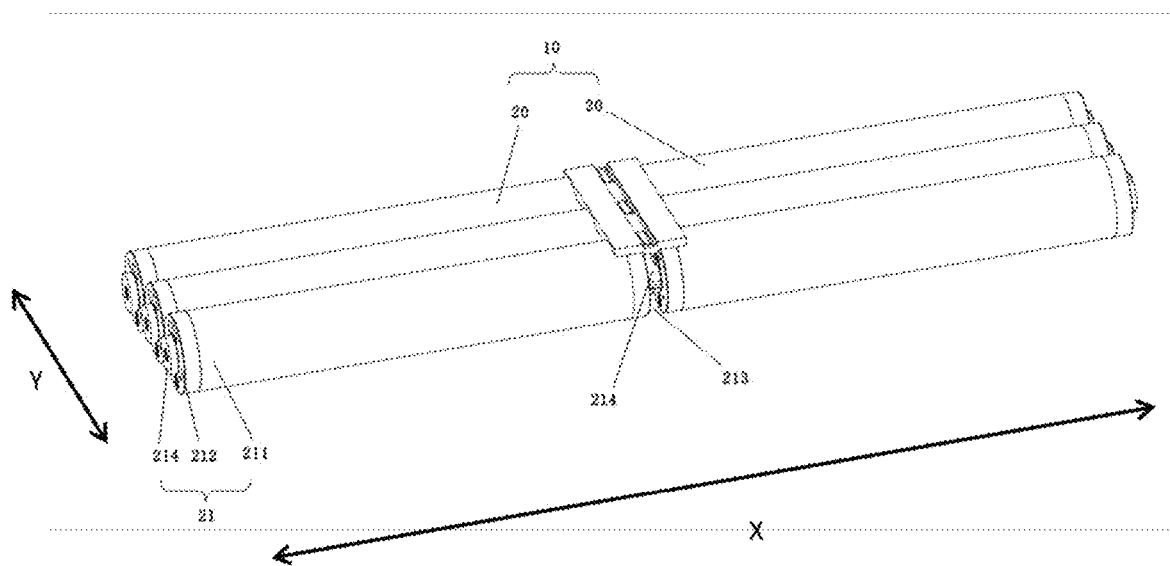
FIG. 4 is a schematic structural diagram of a plurality of battery units according to an embodiment of this application.

FIG. 4 is a schematic structural diagram of a plurality of battery units 10 (in FIG. 4, three battery units 10 are shown, and two battery cells 20 are shown for each battery unit 10) according to an embodiment of this application.

The battery cell 20 includes a can 21, two electrode terminals 214 of opposite polarities, and one or more electrode assemblies (not shown) disposed in the can 21. A shape of the can 21 is determined depending on a shape in which one or more electrode assemblies are combined. For example, a shape of the can 21 may be a cuboid, cube, or cylinder. The can 21 includes a housing 211 and an end cap 212. An opening is provided at an end of the housing 211 in the first direction X, so that one or more electrode assemblies can be placed in the can 21 from the opening, and the opening is closed with the end cap 212. The can 21 is filled with an electrolyte, such as a liquid electrolyte. As shown in FIG. 4, an opening is provided at each of two ends of the housing 211 in the first direction X, the can 21 includes two end caps 212, and the two end caps 212 close the openings respectively at the two ends of the housing 211.

Two electrode terminals 214 are a positive electrode terminal and a negative electrode terminal, and respectively disposed at two ends of the can 21 in the first direction. Specifically, the two electrode terminals 214 are respectively disposed on the two end caps 212, and at least one of the electrode terminals 214 protrudes from the can 21 in a direction leaving the interior of the battery cell 20. The two electrode terminals 214 are respectively disposed on the two end caps 212, and the electrode terminals 214 may be insulated from the end caps 212. Therefore, the can 21 may be insulated from a positive electrode and/or a negative electrode, and is not charged. Under the condition that the can 21 is not charged, a probability of short circuit can be reduced, thereby improving safety performance of the battery cell 20.

As shown in FIG. 4, the plurality of battery cells 20 (two battery cells shown in FIG. 4) are arranged in the first direction X and electrically connected to each other to form the battery unit 10. In this embodiment, the electrode terminals 214 of each of the two battery cells 20 that are electrically connected protrude from the can 21 in the direction leaving the interior of the battery cells 20. It should be noted that, alternatively, the electrode terminals 214 of one of the two battery cells 20 may protrude from the can 21 in the direction leaving the interior of the battery cell 20, and the electrode terminals 214 of the other battery cell 20 are flush with the end cap 212. Alternatively, the two electrode terminals 214 of each battery cell 20 protrude from the can 21 in the direction leaving the interior of the battery cell 20. In this embodiment, the electrode terminals 214 of one battery cell 20 are directly connected to the electrode terminals 214 of the other battery cell 20 to achieve electrical connection. It should be noted that the electrical connection of the two battery cells 20 may alternatively be achieved by means of a connection structure such as a connecting piece. A shape of the electrode terminal 214 may be a cylinder, cuboid, cube, polygonal cylinder, or other various shapes. The electrode terminal shown in this embodiment is a cylindrical structure. A shape of the battery cell 20 may be a cuboid, cube, or cylinder, and the battery cell shown in this embodiment is a cylindrical structure. When a shape of the battery cell is a cylinder, the above-mentioned "first direction" in this application is an axial direction of the battery cell.

Figure 5:
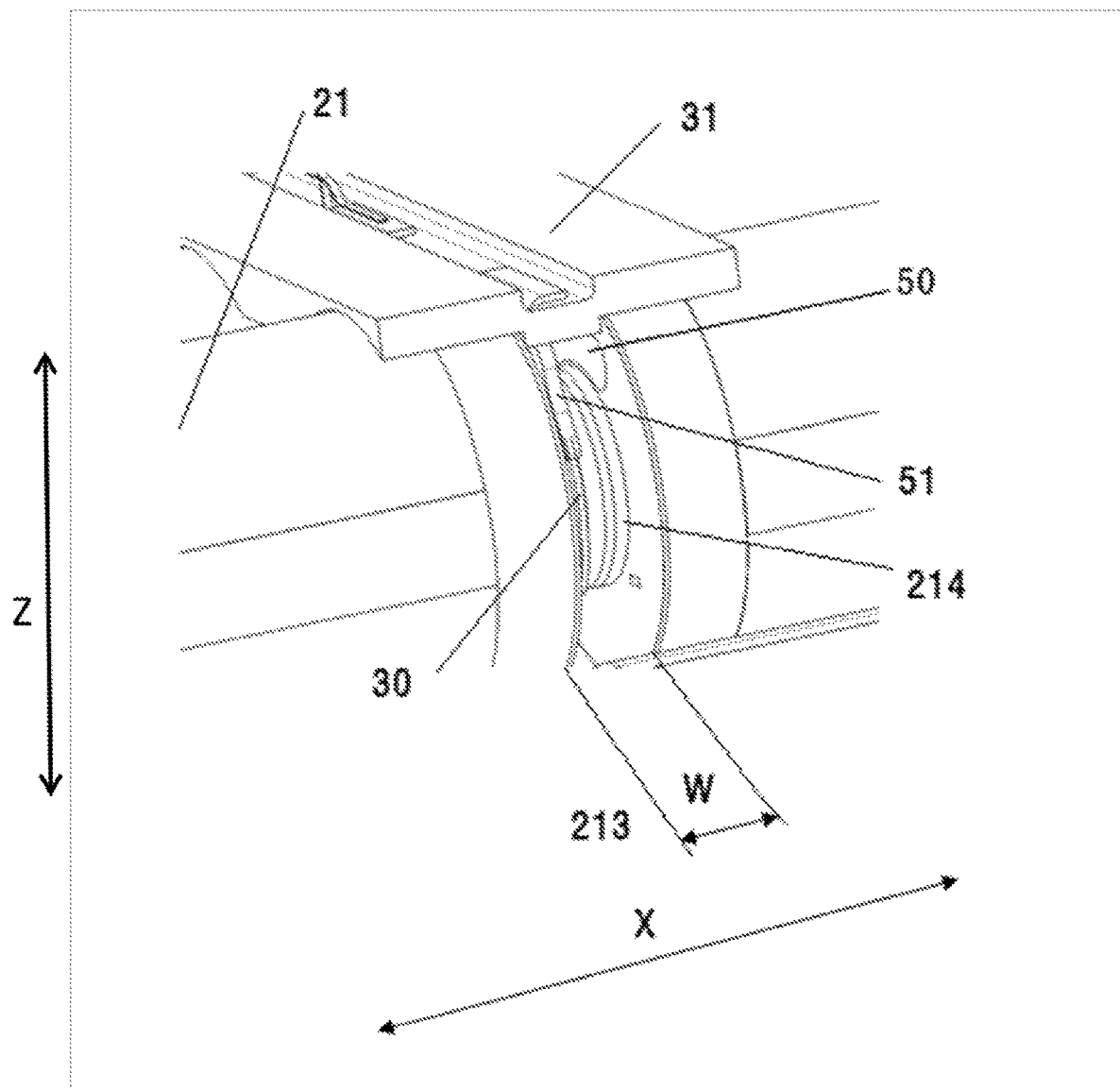
FIG. 5 is a schematic diagram of an enlarged structure of an electrical connection part between two battery cells according to an embodiment of this application.

FIG. 5 is a schematic diagram of an enlarged structure of an electrical connection part between two battery cells 20 according to an embodiment of this application.

In the first direction X, a sampling member 30 is at least partially located between two adjacent battery cells 20, connected to the electrode terminals 214 protruding from the can 21, and configured to perform signal collection on the connected battery cells 20. Specifically, in the first direction X, a gap 213 is formed between the cans 21 of the two adjacent battery cells 20, and the sampling member 30 is at least partially located in the gap 213.

The battery 1 further has an installation plate 31, and two ends of the installation plate 31 in the first direction X are respectively connected to the cans 21 of the two adjacent battery cells 20, so that the installation plate 31 is connected to the battery cells 20.

One of the two adjacent battery cells 20 has a pressure relief mechanism 50, and the pressure relief mechanism 50 is provided at an end of the battery cell 20 in the first direction X. A protective member 51 is provided on a surface of the sampling member 30 facing the pressure relief mechanism 50. The protective member 51 is disposed opposite the pressure relief mechanism 50. In the first direction X, a degassing space is formed between the protective member 51 and the pressure relief mechanism 50.

In this way, the pressure relief mechanism 50 faces the gap 213 between the two battery cells 20, and a part of the sampling member 30 for electrical connection with the electrode terminals 214 is located in the gap 213. In the technical solutions of this application, the protective member 51 is made to locate between the two adjacent battery cells 20 and disposed opposite the pressure relief mechanism 50, and thus the protective member 51 can be used to achieve heat insulation and fire prevention in the event of thermal runaway, to prevent heat generated by one battery cell 20 in thermal runaway from being further conducted to the other battery cell 20 disposed opposite the battery cell 20. Furthermore, the degassing space formed between the protective member 51 and the pressure relief mechanism 50 can make gas guiding and discharging easy, so that the problem of thermal runaway diffusion does not occur.

Figure 6:
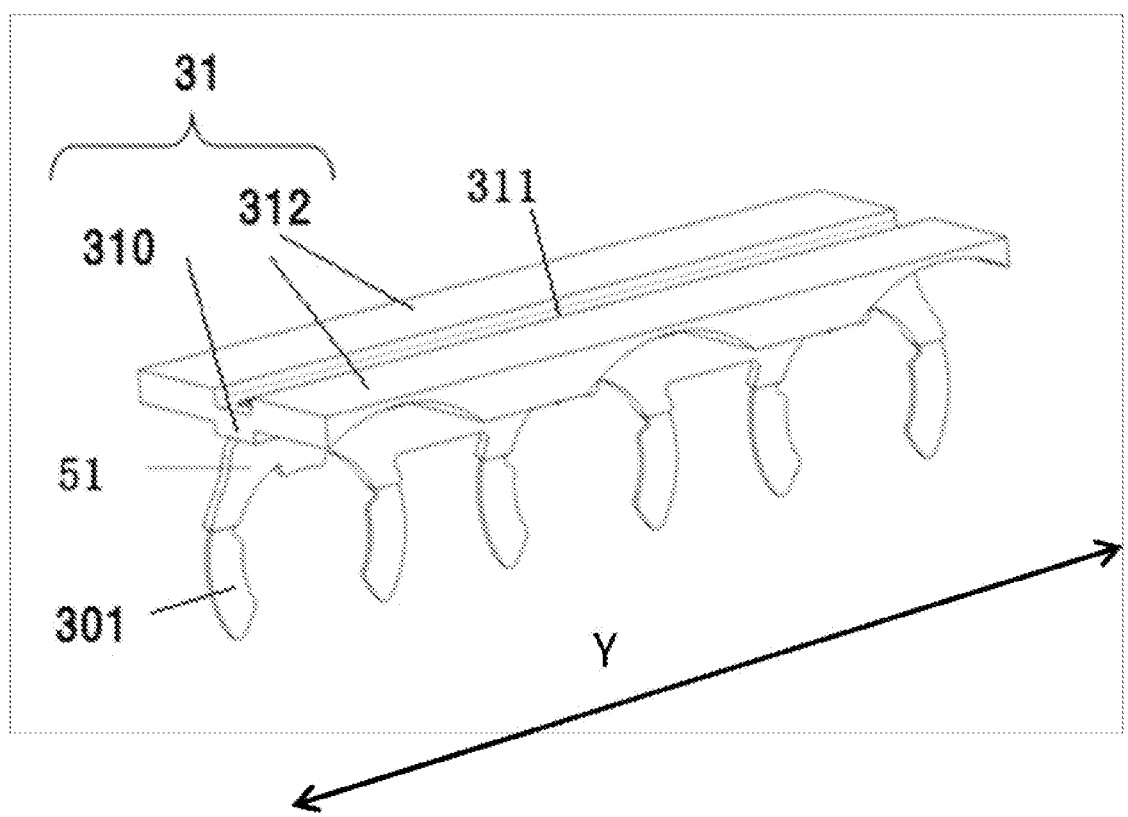
FIG. 6 is a schematic structural diagram of a sampling member with a protective member formed according to an embodiment of this application.

FIG. 6 is a schematic structural diagram of the sampling member 30 with the protective member 51 according to an embodiment of this application.

The electrode terminal 214 includes two end faces disposed in the first direction X and a circumferential side wall connecting the two end faces. The sampling member 30 has a connecting portion 301 configured to electrically connect to the protruding electrode terminal 214. The connecting portion 301 of the sampling member 30 is configured to connect to the circumferential side wall of the electrode terminal 214 for signal collection. In this application, the shape of the electrode terminal 214 may be a cylinder, cuboid, cube, polygonal cylinder, or other various shapes. Under the condition that a shape of the electrode terminal described in this embodiment is a cylinder, the circumferential side wall is a circumferential side of the cylinder. The sampling member 30 is fixed to the installation plate 31 and is installed to the battery cell 20 via the installation plate 31. Specific structures of the sampling member 30 and the installation plate 31 will be described in detail below with reference to FIG. 11 to FIG. 13.

The protective member 51 is fixed to the sampling member 30. The protective member 51 is located between the two adjacent battery cells 20 and disposed opposite the pressure relief mechanism 50, where there is a degassing space between the protective member 51 and the pressure relief mechanism 50. In this embodiment, the protective member 51 is formed in a flat shape.

Optionally, the protective member 51 and the sampling member 30 are integrally formed. Alternatively, the protective member 51 and the sampling member 30 are formed separately, and the protective member 51 is fixed to the sampling member 30. For example, the protective member 51 and the sampling member 30 may be integrally formed through in-mold injection or the like, or may be connected together through clamping, or may be combined through hot pressing riveting, pasting, or the like.

The protective member 51 contains a heat insulating material. Further, a surface of the protective member 51 is coated with a fireproof material. Therefore, the protective member 51 can block emissions spewed from the pressure relief mechanism 50 from spewing to the opposite battery cell 20, and prevent the opposite battery cell 20 from thermal runaway caused by the emissions spewed. The protective member 51 can cool and extinguish the emissions while blocking the emissions. The protective member 51 may be made of one or more materials of mica, ceramic felt, aerogel, and glass fiber.

To effectively guide the emissions spewed from the pressure relief mechanism 50, the protective member 51 is at least partially disposed opposite the pressure relief mechanism 50. For example, an area of a part of the protective member 51 disposed opposite the pressure relief mechanism 50 is 0.35 to 1.5 times an area of the pressure relief mechanism 50. The area of the part of the protective member 51 disposed opposite the pressure relief mechanism 50 in the first direction X is within this range, such that the emissions spewed from the pressure relief mechanism 50 can be effectively blocked, and gases discharged from the pressure relief mechanism 50 can be well guided to prevent adjacent battery cells 20 from thermal runaway.

Figure 7:
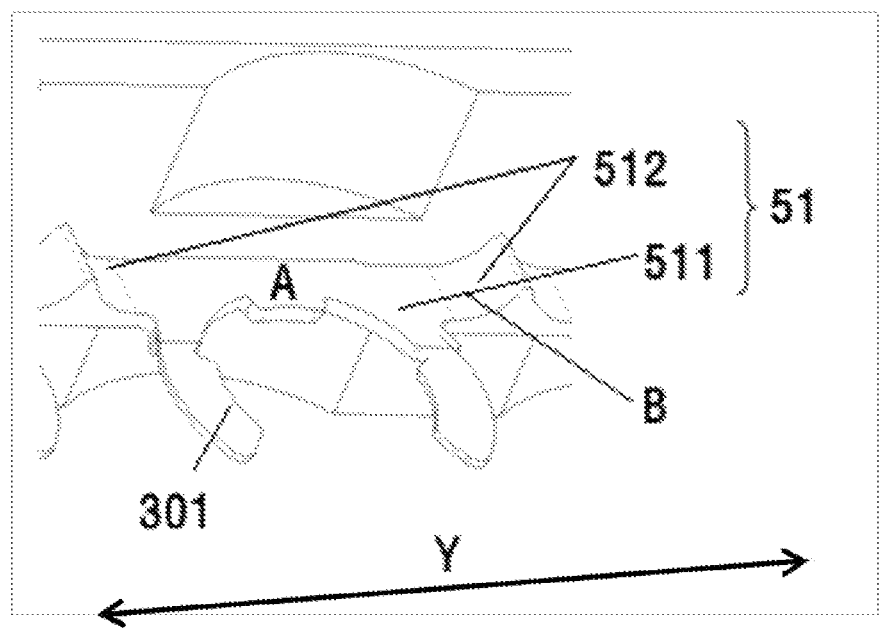
FIG. 7 is a schematic structural diagram of a protective member according to an embodiment of this application.

FIG. 7 is a schematic structural diagram of the protective member 51 according to an embodiment of this application.

In this embodiment, a surface A of the protective member 51 disposed opposite the pressure relief mechanism 50 is a flat surface. The protective member 51 includes a base portion 511 and protrusions 512. The base portion 511 is disposed opposite the pressure relief mechanism 50. The protrusion 512 is located at each of two ends of the base portion 511 in the second direction Y, and extends from the base portion 511 toward the pressure relief mechanism 50. The second direction Y is perpendicular to the first direction X. The protrusion 512 may alternatively be formed only at an end of the base portion 511 in the second direction Y. A surface of the protrusion 512 adjacent to the base portion 511 is a curved surface B, and the curved surface B is formed so as to be recessed toward the base portion 511.

With the foregoing structure used, the base portion 511 of the protective member 51 is disposed opposite the pressure relief mechanism 50, to block the emissions spewed from the pressure relief mechanism 50 from spewing to the oppositely disposed battery cell 20. Moreover, the protrusion 512 formed at an end of the base portion 511 in the second direction Y can block the emissions from directly spewing to other adjacent battery cells 20, thereby minimizing adverse impact on other battery cells 20 adjacent to the end of the base portion 511 in the second direction Y. Further, the protective member 51 may have the protrusion 512 at each of two ends of the base portion 511 in the second direction Y. In this way, the emissions can be more effectively prevented from directly spewing to other adjacent battery cells 20, thereby minimizing adverse impact on other battery cells 20 adjacent to the end of the base portion in the second direction Y. In addition, the protrusion 512 and the base portion 511 are connected through the curved surface, so that the emissions spewed from the pressure relief mechanism 50 can be smoothly guided.

In this embodiment, the structure in which the surface of the protective member 51 disposed opposite the pressure relief mechanism 50 is flat is shown, but the surface of the protective member 51 disposed opposite the pressure relief mechanism 50 may alternatively be a curved surface.

Figure 8:
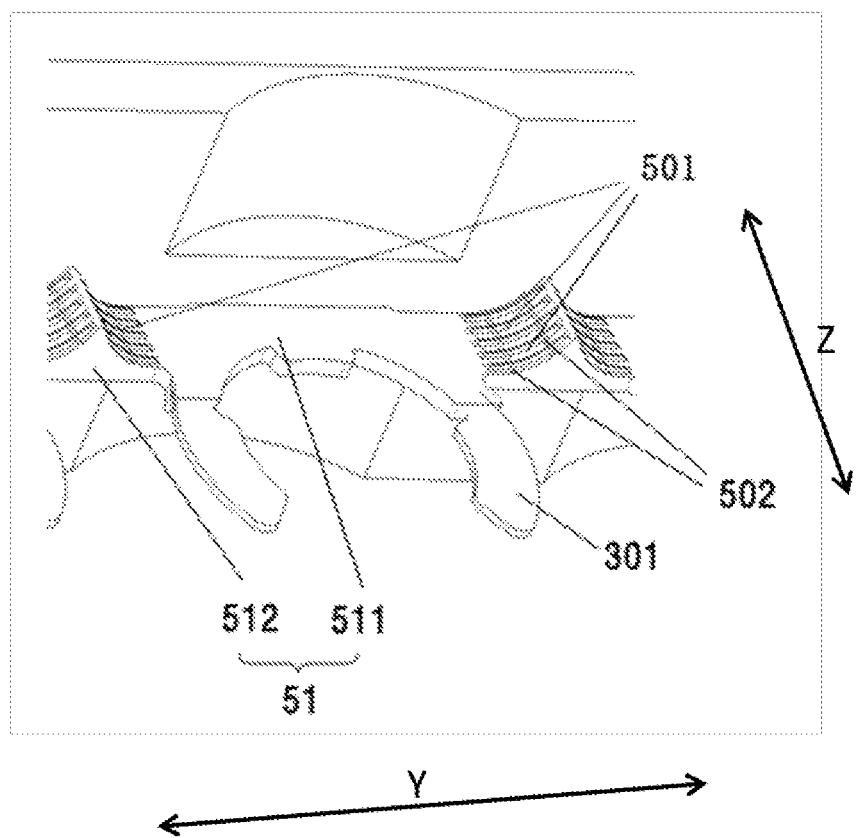
FIG. 8 is a schematic structural diagram of a protective member with guide strips according to an embodiment of this application.

FIG. 8 is a schematic structural diagram of the protective member 51 with guide strip 501 according to an embodiment of this application. A plurality of protruding guide strips 501 are provided on a surface of the protrusion 512 adjacent to the base portion 511, and the plurality of guide strips 501 are arranged in a third direction Z, and the third direction Z is perpendicular to the first direction X and the second direction Y. The guide strips 501 are formed for flow diversion, and the plurality of guide strips 501 are arranged in the third direction Z, and therefore these guide strips 501 can be used to better guide the emissions to the pressure relief mechanism 50 in the second direction Y.

In addition, a plurality of protuberances 502 are formed between two adjacent guide strips 501. A height of the protuberances 502 protruding from the surface of the protective member 51 is smaller than a height of the guide strips 501 protruding from the surface of the protective member 51. Such protuberances 502 can more effectively reduce a flow rate of the emissions, and the protuberances 502 do not affect the flow guiding effect of the guide strips 501 on the emissions.

Figure 9:
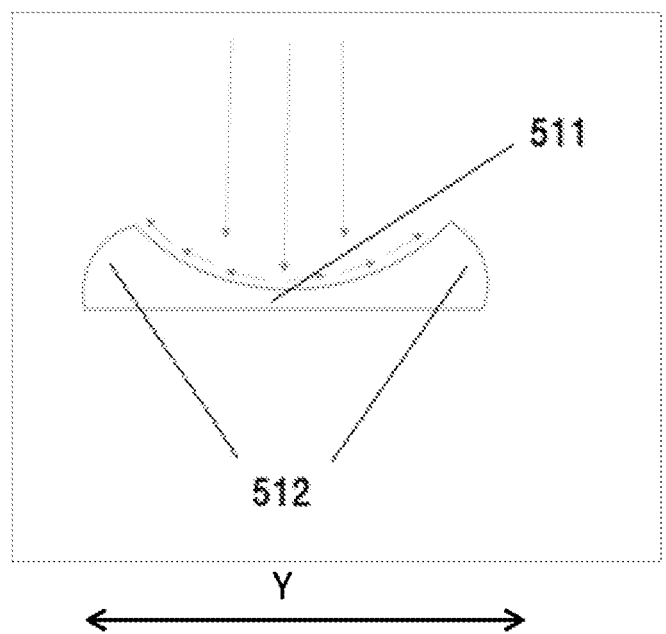
FIG. 9 shows a structure of a protective member according to another embodiment of this application.

FIG. 9 shows a structure of the protective member 51 according to another embodiment of this application. In this embodiment, the surface of the protective member 51 disposed opposite the pressure relief mechanism 50 is a curved surface, and the curved surface is smoothly connected to a curved surface connecting the base portion 511 and the protrusion 512 to form an entirety. In this way, the emissions spewed from the pressure relief mechanism 50 flows as shown by the arrows in FIG. 9, and is smoothly guided to the two ends in the second direction Y. In addition, the guide strips 501 and the protuberances 502 shown in FIG. 8 can both be formed on the protective member 51 shown in FIG. 9, and the protrusions 512 may be formed only at an end of the base portion 511 in the second direction Y.

Figure 10:
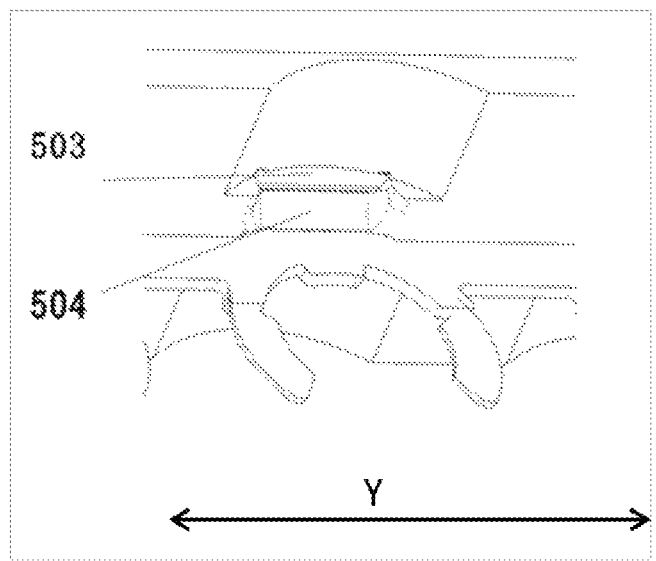
FIG. 10 is a schematic structural diagram of a vent hole and a guide member according to an embodiment of this application.

FIG. 10 is a schematic diagram of a structure with vent holes 503 formed on the installation plate 31 and a guide member 504 for guiding discharged gases to the vent holes 503 according to an embodiment of this application.

A plurality of vent holes 503 (one vent hole shown in FIG. 10) are formed on the installation plate 31, and the guide member 504 is disposed in a zone of the installation plate 31 near the vent holes 503 and configured to guide the emissions from the pressure relief mechanism 51 to the vent holes 503. In this way, the guide member 504 can guide the emissions discharged from the pressure relief mechanism 50 to the vent holes 503, thereby further preventing adjacent battery cells 20 from thermal runaway.

The guide member 504 may alternatively be an integral structure with the installation plate 31, and the guide member 504 has an inclined surface inclined from the protective member 51 toward the vent holes 503. To be specific, the guide member 504 is a part of the installation plate 31, and the inclined surface inclined from the protective member 51 toward the vent holes 503 is formed on the installation plate 31, to guide the emissions discharged from the pressure relief mechanism 50 to the vent holes 503 of the installation plate 31.

Figure 11:
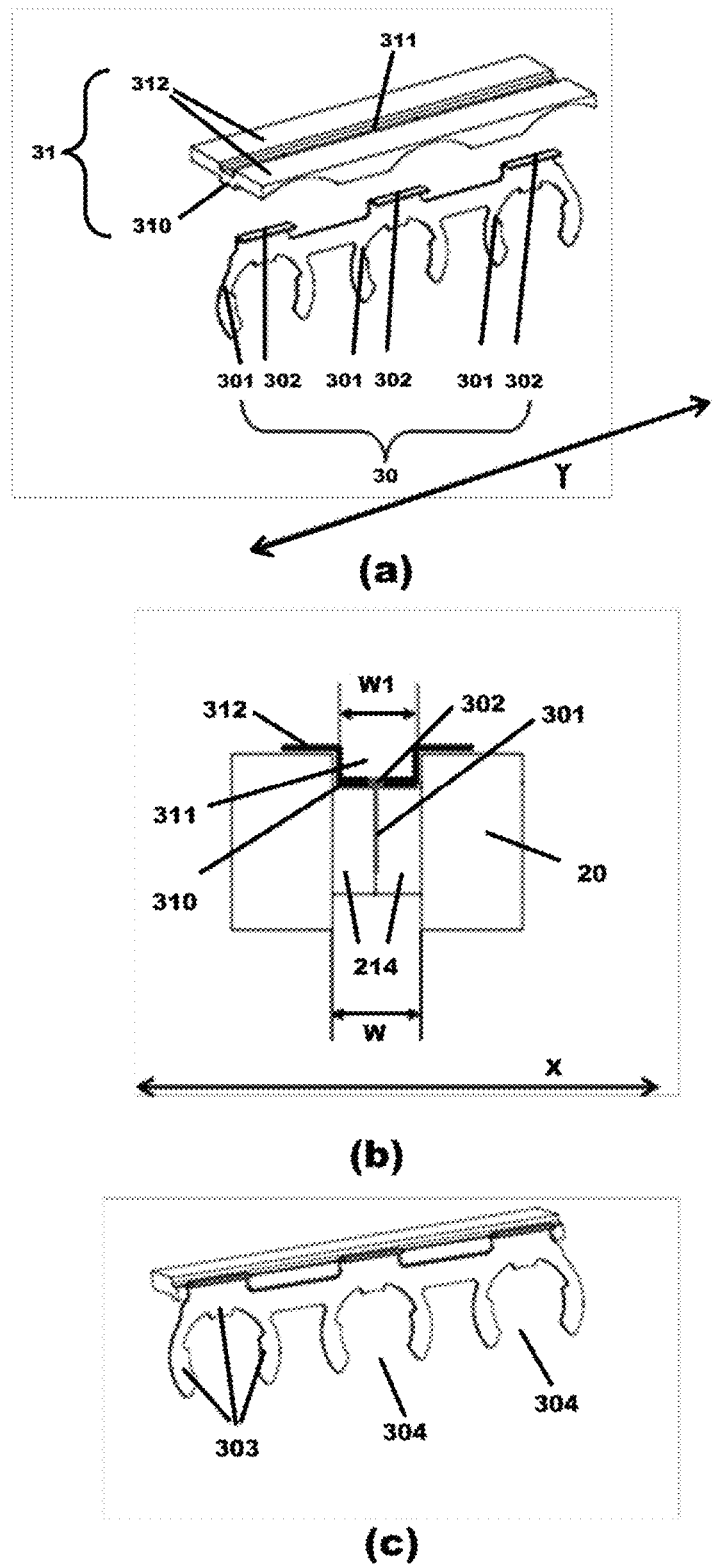
FIG. 11 is a schematic structural diagram of assembling a sampling member and an installation plate according to an embodiment of this application, where FIG. 11(*a*) is a schematic three-dimensional structural diagram of the sampling member and the installation plate that are separated from each other, FIG. 11(*b*) is a schematic structural side view of the sampling member and the installation plate that are installed between two adjacent battery cells, and FIG. 11(*c*) is a schematic three-dimensional structural diagram of the sampling member and the installation plate that are integrated together.

FIG. 11 is a schematic structural diagram of assembling the sampling member 30 and the installation plate 31 according to an embodiment of this application. FIG. 11(a) is a schematic three-dimensional structural diagram of the sampling member 30 and the installation plate 31 that are separated from each other according to this embodiment, FIG. 11(b) is a schematic structural side view of the sampling member 30 and the installation plate 31 that are installed between two adjacent battery cells 20 according to this embodiment, and FIG. 11(c) is a schematic three-dimensional structural diagram of the sampling member 30 and the installation plate 31 that are integrated together according to this embodiment.

As shown in FIG. 11(a), the installation plate 31 has an installation portion 310 and two extension portions 312, and the installation portion 310 is connected between the two extension portions 312 and is used for fixing with the sampling member 30. The sampling member 30 has a connecting portion 301 and a fixing portion 302. An extending direction of the fixing portion 302 intersects an extending direction of the connecting portion 301, so that the sampling member 30 is formed in, for example, a 7-shape or a T-shape.

One sampling member 30 may have a plurality of connecting portions 301 arranged in the second direction Y, and each connecting portion 301 is connected to the circumferential side walls of the corresponding electrode terminals 214 of the battery units 10 arranged in the second direction Y. Moreover, correspondingly, the installation plate 31 also extends in the second direction Y so that a plurality of sampling members 30 can be installed. FIG. 11(a) shows a structure in which the sampling member 30 has three connecting portions 301. Therefore, the sampling member 30 may simultaneously collect electrical signals from the plurality of battery cells 20 arranged in the second direction Y, and the electrode terminals 214 of the plurality of battery cells 20 that are electrically connected to a plurality of connecting portions 301 of one sampling member 30 can have an equal potential, thereby achieving voltage balance of the battery cells 20 and improving consistency of the battery cells 20.

As shown in FIG. 11(b), the two extension portions 312 of the installation plate 31 are respectively overlapped with the cans 21 of the two adjacent battery cells 20. The extension portion 312 is in a flat plate shape. The extension portion 312 is adhered to the can 21 of the battery cell 20, so as to fix the installation plate 31 to the can 21. The installation portion 310 of the installation plate 31 is recessed toward the gap 213 to form a groove 311. Due to the existence of the groove 311, a circuit component for transmitting an electrical signal can be arranged in a space of the groove 311, thereby improving space utilization and increasing the energy density of the battery.

The installation portion 310 is engaged with the gap 213. In the first direction X, a width W1 of the installation portion 310 is substantially equal to a width W of the gap 213. In this way, during installation of the installation plate 31, the installation portion 310 can be used for fixing, and prevent the two adjacent battery cells 20 from moving.

The electrode terminal 214 includes two end faces disposed in the first direction X and a circumferential side wall connecting the two end faces. The connecting portion 301 of the sampling member 30 is connected to the circumferential side wall of the electrode terminal 214 for signal collection. The fixing portion 302 of the sampling member 30 passes through the installation portion 310 and is fixed to the installation portion 310, thereby fixing the sampling member 30 to the installation plate 31. In this application, the shape of the electrode terminal 214 may be a cylinder, cuboid, cube, polygonal cylinder, or other various shapes. Under the condition that a shape of the electrode terminal described in this embodiment is a cylinder, the circumferential side wall is a circumferential side of the cylinder.

The installation plate 31 and the sampling member 30 may be integrally formed through in-mold injection or the like, or may be separate structures and connected together through clamping, or may be connected through hot pressing riveting or the like. The installation plate 31 is made of, for example, polycarbonate (Polycarbonate) and polyacrylonitrile (ABS) materials to have an insulating function, and the sampling member 30 is made of, for example, aluminum alloy or steel, and is configured to collect and transmit signals. The signal collected by the sampling member 30 is transmitted through a flexible flat cable (for example, FFC) or a flexible printed circuit board (for example, FPC) to a signal processor or the like for processing. The sampling member 30 is exposed to an upper surface of the installation plate 31 to facilitate the flexible flat cable (or flexible printed circuit board) to contact the sampling member 30 and transmit the collected signal. In addition, the extension portion 312 of the installation plate 31 shown in this embodiment of this application is in a flat plate form in its part that is in contact with the can of the battery cell 20, but the structure of the installation plate 31 is not limited thereto, and can also be in a curve plate form that matches a shape of the circumferential side of the can of the battery cell 20 in contact. Moreover, the battery 1 may further include a temperature sampler. The temperature sampler may be disposed on the installation plate 31, to be in contact with the can 21 of the battery cell 20 for temperature measurement.

In this embodiment, the connecting portion 301 is clamped to the circumferential side wall of the electrode terminal 214. As shown in FIG. 11(c), the connecting portion 301 is formed with an opening 304 on the side opposite the installation plate 31, and the opening 304 is elastic. When the connecting portion 301 is assembled with the electrode terminal 214, the opening 304 is first opened through elastic deformation, and then clamped to the circumferential side wall of the electrode terminal 214 and assembled with the electrode terminal 214. After the assembly, an elastic restoring force of the opening 304 can be used to maintain the engagement with the electrode terminal 214, so as to closely fit the electrode terminal 214. Such an installation structure is simple and convenient, and no additional fixing structure is required. In addition, the gap 213 between the two battery cells 20 can be fully used without occupying too much configuration spaces of the battery cells 20, so that the energy density of the battery can be increased accordingly.

To achieve a stable electrical connection, the connecting portion 301 wraps the electrode terminal 214 by a size greater than or equal to one half of a circumference of the circumferential side wall of the electrode terminal 214 and less than the circumference of the circumferential side wall of the electrode terminal 214. The connecting portion 301 has the opening formed for clamping the circumferential side wall of the electrode terminal 214 and wrapping the electrode terminal 214 in a large area, and therefore structural stability can be enhanced.

When the electrode terminal 214 protruding from the can 21 is cylindrical, the connecting portion 301 wraps the electrode terminal 214 by an angle greater than or equal to 180 degrees and less than 360 degrees. The electrode terminal 214 is cylindrical, so that the sampling member 30 can be more easily installed on the electrode terminal 214.

As shown in FIG. 11(c), a plurality of convex portions 303 may be provided on an inner surface of the sampling member 30 for clamping the circumferential side surface of the electrode terminal 214. To further improve the accuracy and stability in assembling the sampling member 30 and the electrode terminal 214, a plurality of concave portions corresponding to the convex portions 303 are formed in the circumferential side wall of the electrode terminal 214, and the concave portions fit the convex portions 303. In this way, the connecting portion 301 can be prevented from moving or rotating relative to the electrode terminal 214, thereby improving the connection stability.

Figure 12:
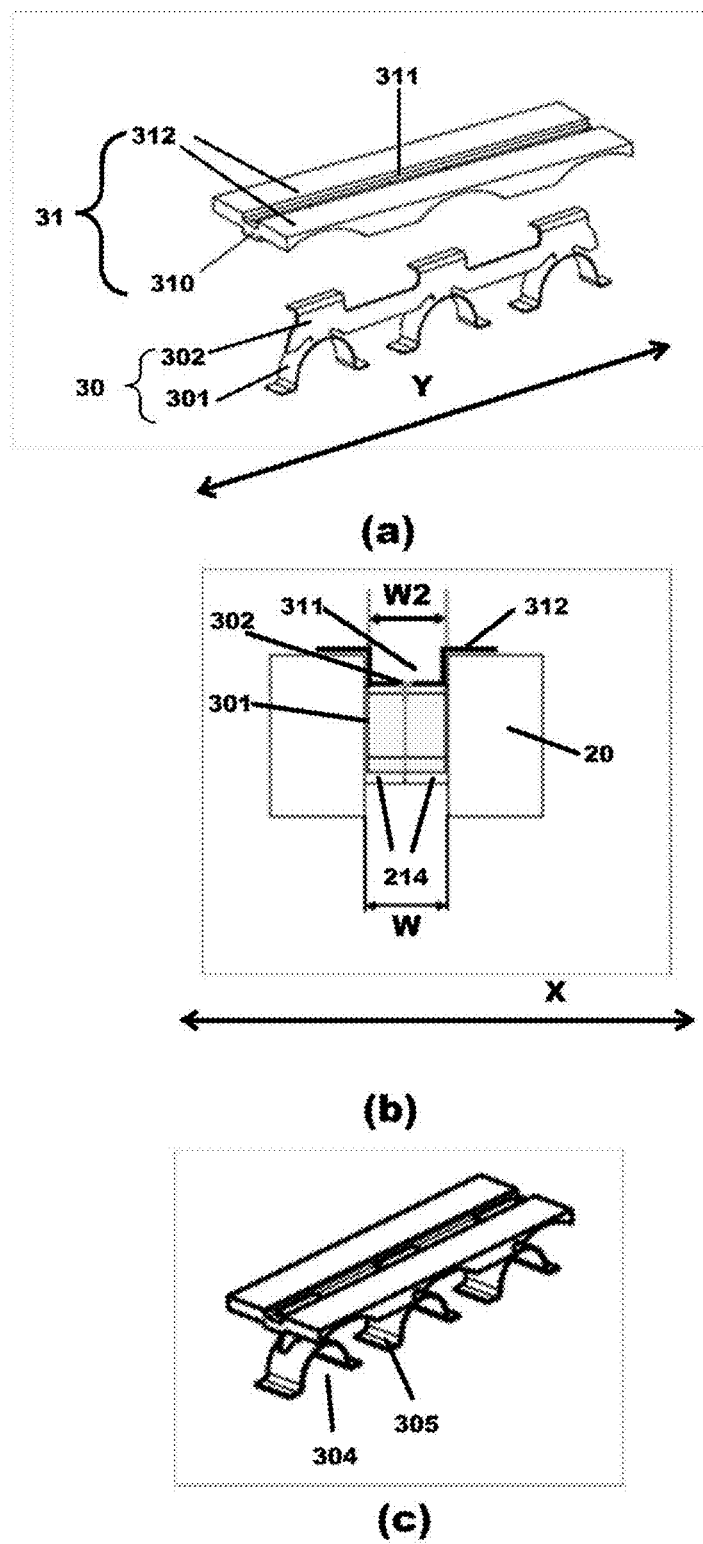
FIG. 12 is a schematic structural diagram of assembling a sampling member and an installation plate according to another embodiment of this application, where FIG. 12(*a*) is a schematic three-dimensional structural diagram of the sampling member and the installation plate that are separated from each other, FIG. 12(*b*) is a schematic structural side view of the sampling member and the installation plate that are installed between two adjacent battery cells, and FIG. 12(*c*) is a schematic three-dimensional structural diagram of the sampling member and the installation plate that are integrated together.

FIG. 12 is a schematic structural diagram of assembling the sampling member 30 and the installation plate 31 according to another embodiment of this application. FIG. 12(a) is a schematic three-dimensional structural diagram of the sampling member 30 and the installation plate 31 that are separated from each other according to this embodiment, FIG. 12(b) is a schematic structural side view of the sampling member 30 and the installation plate 31 that are installed between two adjacent battery cells 20 according to this embodiment, and FIG. 12(c) is a schematic three-dimensional structural diagram of the sampling member 30 and the installation plate 31 that are integrated together according to this embodiment.

In this embodiment, the connecting portion 301 of the sampling member 30 is fully attached to the circumferential side wall of the electrode terminal 214. Moreover, in the first direction X, a size W2 of the connecting portion 301 is substantially equal to a size W of the gap 213. In this way, the connecting portion 301 can be exactly clamped to the gap 213 between the two battery cells 20.

In this embodiment, similar to the embodiment shown in FIG. 11, the connecting portion 301 is engaged with the circumferential side wall of the electrode terminal 214. The connecting portion 301 is formed with an opening 304 on the side opposite the installation plate 31, and the opening 304 is elastic. When the connecting portion 301 is assembled with the electrode terminal 214, the opening 304 is first opened through elastic deformation, and then clamped to the circumferential side wall of the electrode terminal 214 and assembled with the electrode terminal 214. After the assembly, an elastic restoring force of the opening 304 can be used to maintain the engagement with the electrode terminal 214, so as to closely fit the electrode terminal 214. To achieve a stable electrical connection, the connecting portion 301 wraps the electrode terminal 214 by a size greater than or equal to one half of a circumference of the circumferential side wall of the electrode terminal 214 and less than the circumference of the circumferential side wall of the electrode terminal 214. When the electrode terminal 214 protruding from the can 21 is cylindrical, the connecting portion 301 wraps the electrode terminal 214 by an angle greater than or equal to 180 degrees and less than 360 degrees.

As shown in FIG. 12(c), an end 305 of the connecting portion 301 at the opening 304 is bent toward the installation plate 31. In this way, the connecting portion 301 does not contact the circumferential side surface of the electrode terminal 214 with the sharp end 305, so that damage to the electrode terminal 214 caused by the end 305 of the connecting portion 301 in the clamping process can be prevented. In addition, the end 305 can be used to fix to the sampling member 30 to further prevent the sampling member 30 from separating from the electrode terminal 214.

In addition, under the condition that the plurality of battery units 10 shown in FIG. 3 are arranged in the second direction Y, the end 305 is accommodated in a gap between adjacent battery units 10 in the direction Y. This can not only reduce damage to the circumferential side surface of the battery cell 20 by the connecting portion 301, but also can effectively use the space.

Figure 13:
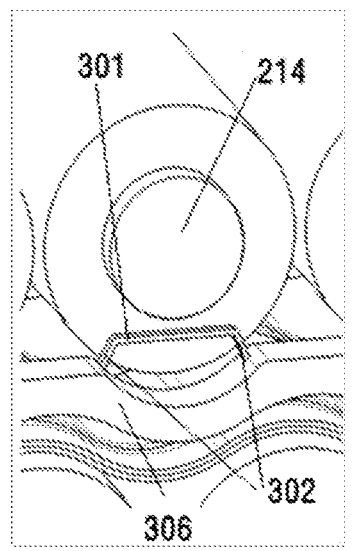
FIG. 13 is a schematic structural diagram of a sampling member according to another embodiment of this application, where FIG. 13(*a*) shows a state in which the sampling member is not in contact with electrode terminals, and FIG. 13(*b*) shows a state in which the sampling member is in contact with the electrode terminals.
Figure 13:
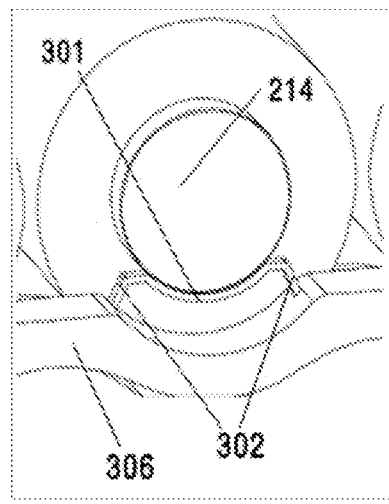

FIG. 13 is a schematic structural three-dimensional diagram of the sampling member 30 according to another embodiment of this application. FIG. 13(a) shows a state in which the connecting portion 301 of the sampling member 30 is not in contact with the electrode terminal 214 and has not yet been elastically deformed, and FIG. 13(b) shows that the connecting portion 301 of the sampling member 30 is in contact with the electrode terminal 214, elastically deformed, and fits a shape of the circumferential side surface of the electrode terminal 214.

The sampling member 30 has a connecting portion 301 and a fixing portion 302. In this embodiment, the connecting portion 301 is also connected to the circumferential side wall of the electrode terminal 214. The connecting portion 301 is elastic, and when subjected to an external force, the connecting portion 301 is deformed in response to the external force, so as to fit the circumferential side wall of the electrode terminal 214, thereby achieving surface contact with the electrode terminal 214. The external force herein may be the gravity of the battery cell 20 itself, a pressure during battery assembly, a fixing force from another fixing portion, and the like. When the electrode terminal 214 protruding from the can 21 is cylindrical, the connecting portion 301 wraps the electrode terminal 214 by an angle greater than 0 degrees and less than 180 degrees.

In this way, the connecting portion 301 can adaptively fit the circumferential side wall of the electrode terminal 214 through the elastic deformation, to achieve good surface contact with the electrode terminal 214, thereby achieving a more stable electrical connection between the sampling member 30 and the electrode terminal 214. The connecting portion 301 is fixed to a supporting member 306 via the fixing portion 302.

In addition, in an embodiment of this application, the two electrode terminals 214 of each of the battery cells 20 protrude from the can 21 in the direction leaving the interior of the battery cell 20, and in the two adjacent battery cells 20, the electrode terminals 214 of one battery cell 20 are disposed opposite and butt up against the electrode terminals 214 of the other battery cell 20. Furthermore, the electrode terminal 214 of one battery cell 20 and the electrode terminal 214 of the other battery cell 20 are welded together.

Because the electrode terminals 214 of the two adjacent battery cells 20 directly butt up to achieve electrical connection, components for electrical connection can be reduced, thereby increasing the energy density of the battery. Moreover, by directly welding the two protruding electrode terminals 214 in this way, a stable electrical connection between the two adjacent battery cells 20 can be achieved.

When the two electrode terminals 214 are welded, uneven welding zones are often formed on the two electrode terminals 214. By staggering the contact zones between the sampling member 30 and the electrode terminals 214 and the welding zones of the electrode terminals 214 in the first direction X, the sampling member can be prevented from being connected to the welding zones to cause poor contact and lower sampling accuracy, so as to improve assembly accuracy.

An embodiment of this application further provides an electric apparatus, where the electric apparatus may include the battery 1 in each of the foregoing embodiments. The battery 1 is configured to provide electric energy in the electric apparatus.

The battery and the electric apparatus in the embodiments of the application are described above, and the method and apparatus for preparing a battery in the embodiment of the application will be described below. For parts not described in detail, reference may be made to the foregoing embodiments.

Figure 14:
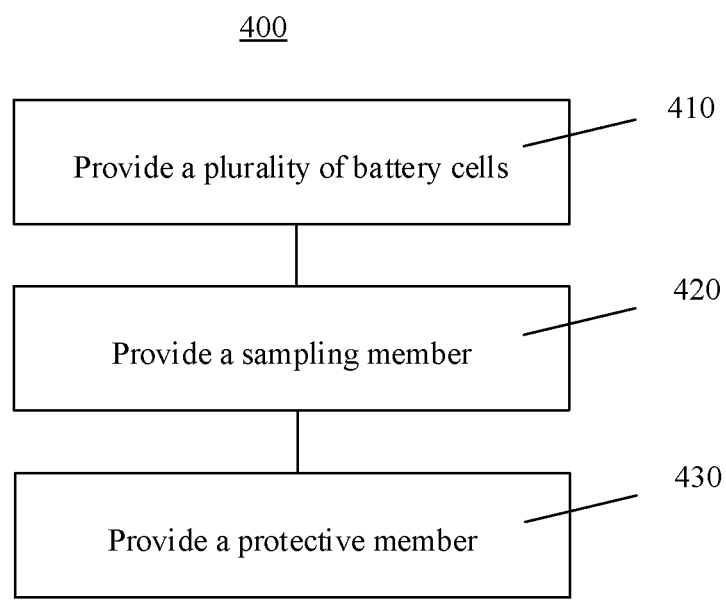
FIG. 14 is a schematic flowchart of a method for preparing a battery according to an embodiment of this application.

FIG. 14 is a schematic flowchart of a method 400 for preparing a battery according to an embodiment of this application. As shown in FIG. 14, the method 400 may include the following steps.

410: Provide a plurality of battery cells 20, where the plurality of battery cells 20 are arranged in a first direction X and electrically connected to each other, at least one of two adjacent battery cells 20 has a pressure relief mechanism 50, and the pressure relief mechanism 50 is disposed at an end of the battery cell 20 in the first direction X.

420. Provide a sampling member 30, where the sampling member 30 is connected to the battery cells 20 and is configured to perform signal collection on the battery cells 20.

430: Provide a protective member 51, where the protective member 51 is located between the two adjacent battery cells 20 and disposed opposite the pressure relief mechanism 50, and there is a degassing space between the protective member 51 and the pressure relief mechanism 50.

The protective member 51 is fixed to the sampling member 30.

Figure 15:
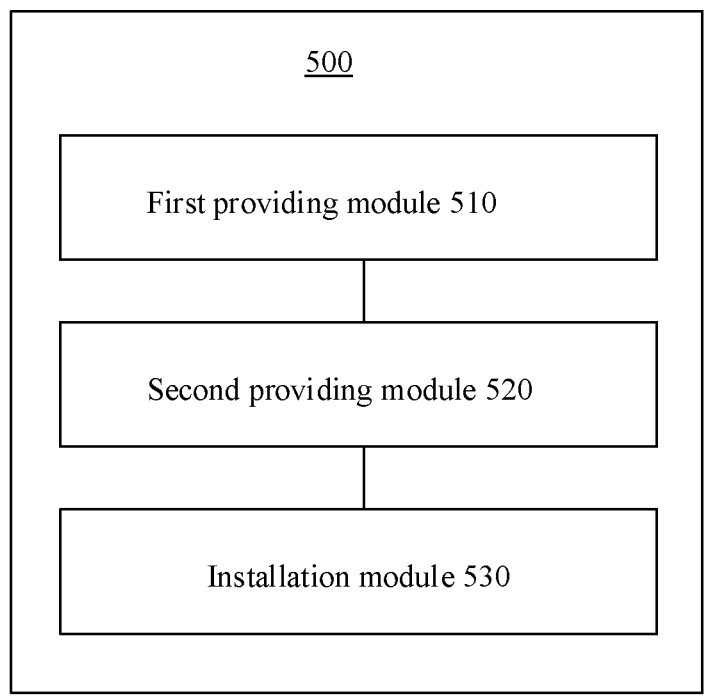
FIG. 15 is a schematic block diagram of an apparatus for preparing a battery according to an embodiment of this application.

FIG. 15 is a schematic block diagram of an apparatus 500 for preparing a battery according to an embodiment of this application. As shown in FIG. 15, the apparatus 500 for preparing a battery may include: a first providing module 510, a second providing module 520, and an installation module 530.

The first providing module 510 is configured to provide a plurality of battery cells 20, where the plurality of battery cells 20 are arranged in a first direction X and electrically connected to each other, at least one of two adjacent battery cells 20 has a pressure relief mechanism 50, and the pressure relief mechanism 50 is disposed at an end of the battery cell 20 in the first direction X.

The second providing module 520 is configured to provide a sampling member 30 fixed to a protective member 51.

The installation module 530 is configured to connect the sampling member 30 to the battery cells 20, the sampling member 30 is configured to perform signal collection on the battery cells 20, and configured to locate the protective member 51 between the two adjacent battery cells 20 and disposed opposite the pressure relief mechanism 50, and there is a degassing space between the protective member 51 and the pressure relief mechanism 50.

In conclusion, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A battery, comprising:
   a plurality of battery cells arranged in a first direction and electrically connected to each other, wherein each of the battery cells comprises a can and two electrode terminals of opposite polarities, the two electrode terminals are respectively disposed at two ends of the can in the first direction, and at least one of the electrode terminals protrudes from the can in a direction leaving an interior of the battery cell, wherein at least one of two adjacent battery cells has a pressure relief mechanism, and the pressure relief mechanism is disposed at an end of the battery cell in the first direction;
   a sampling member connected to the battery cells, wherein a connecting portion of the sampling member is located in a gap formed between two adjacent battery cells of the plurality of batteries, the connecting portion is configured to connect the electrode terminals of the battery cell, the connecting portion is configured to simultaneously collect electrical signals from the battery cells and transmit the electrical signals to a signal processor; and
   a protective member located between the two adjacent battery cells and disposed opposite the pressure relief mechanism, wherein a degassing space is formed between the protective member and the pressure relief mechanism;
   wherein the protective member is fixed to the connecting portion of the sampling member,
   wherein the connecting portion is connected to a circumferential side wall of the electrode terminal,
   wherein a plurality of convex portions are provided on an inner surface of the sampling member, a plurality of concave portions corresponding to the convex portions are provided in a circumferential side wall of the electrode terminal, and the plurality of concave portions fit the plurality of convex portions for clamping the circumferential side wall of the electrode terminal.

2. The battery according to claim 1, wherein a surface of the protective member disposed opposite the pressure relief mechanism is a flat surface.

3. The battery according to claim 1, wherein a surface of the protective member disposed opposite the pressure relief mechanism is a curved surface.

4. The battery according to claim 1, wherein the protective member comprises a base portion and a protrusion, the base portion is disposed opposite the pressure relief mechanism, the protrusion is located at an end of the base portion in a second direction and extends from the base portion toward the pressure relief mechanism, and the second direction is perpendicular to the first direction.

5. The battery according to claim 4, wherein the protective member has the protrusion at two ends of the base portion in the second direction.

6. The battery according to claim 4, wherein a surface of the protrusion adjacent to the base portion is a curved surface, and the curved surface is formed so as to be recessed toward the base portion.

7. The battery according to claim 6, wherein a plurality of protruding guide strips are provided on the surface of the protrusion adjacent to the base portion, the plurality of guide strips are arranged in a third direction, and the third direction is perpendicular to the first direction and the second direction.

8. The battery according to claim 7, wherein a plurality of protuberances are formed between two adjacent guide strips.

9. The battery according to claim 8, wherein a height at which the protuberances protrude from a surface of the protective member is smaller than a height at which the guide strips protrude from the surface of the protective member.

10. The battery according to claim 1, wherein an area of a part of the protective member disposed opposite the pressure relief mechanism is 0.35 to 1.5 times an area of the pressure relief mechanism.

11. The battery according to claim 1, further comprising an installation plate, wherein two ends of the installation plate in the first direction are respectively connected to the two adjacent battery cells, and the installation plate is configured to fix to the sampling member.

12. The battery according to claim 11, wherein a plurality of vent holes are formed in the installation plate, and guide members are correspondingly provided in a zone of the installation plate adjacent to the vent holes for guiding emissions discharged from the pressure relief mechanism to the vent holes.

13. The battery according to claim 12, wherein the guide member and the installation plate are of an integral structure, and the guide member has an inclined surface inclined from the protective member toward the vent holes.

14. The battery according to claim 1, wherein the connecting portion is elastic, is configured to deform in response to an external force to attach to the circumferential side wall of the electrode terminal, so as to achieve surface contact with the electrode terminal.

15. The battery according to claim 14, wherein the electrode terminal protruding from the can is cylindrical, and the connecting portion wraps the electrode terminal by an angle greater than 0 degrees and less than 180 degrees.

16. An electric apparatus, comprising the battery according to claim 1.

17. A method for preparing a battery, the method comprising:
   providing a plurality of battery cells, wherein the plurality of battery cells are arranged in a first direction and electrically connected to each other, wherein each of the battery cells comprises a can and two electrode terminals of opposite polarities, the two electrode terminals are respectively disposed at two ends of the can in the first direction, and at least one of the electrode terminals protrudes from the can in a direction leaving an interior of the battery cell, at least one of two adjacent battery cells has a pressure relief mechanism, and the pressure relief mechanism is disposed at an end of the battery cell in the first direction;

providing a sampling member, wherein the sampling member is connected to the battery cells, a connecting portion of the sampling member is located in a gap formed between two adjacent battery cells of the plurality of batteries, the connecting portion is configured to connect the electrode terminals of the battery cell, the connecting portion is configured to simultaneously collect electrical signals from the battery cells and transmit the electrical signals to a signal processor; and providing a protective member, wherein the protective member is fixed to the connecting portion and located between the two adjacent battery cells and disposed opposite the pressure relief mechanism, and a degassing space is formed between the protective member and the pressure relief mechanism, wherein the protective member is fixed to connecting portion of the sampling member, wherein the connecting portion is connected to a circumferential side wall of the electrode terminal, wherein a plurality of convex portions are provided on an inner surface of the sampling member, a plurality of concave portions corresponding to the convex portions are provided in a circumferential side wall of the electrode terminal, and the plurality of concave portions fit the plurality of convex portions for clamping the circumferential side wall of the electrode terminal.

18. The battery according to claim 11, wherein the connecting portion is formed with an opening on a side opposite the installation plate, and the opening is elastic, wherein when the connecting portion is assembled with an electrode terminal of one of the plurality of battery cells, the opening is opened through elastic deformation, and clamped to the circumferential side wall of the electrode terminal and assembled with the electrode terminal.

\* \* \* \* \*